United States Patent

Rothamel et al.

[11] Patent Number: 5,847,277
[45] Date of Patent: Dec. 8, 1998

[54] METHOD OF ROTATING A ROTARY MEMBER IN A BALANCING MACHINE INTO BALANCING POSITIONS IN FIRST AND SECOND BALANCING PLANES

[75] Inventors: Karl Rothamel, Seeheim-Jugenheim; Wolfgang Röwe, Bickenbach, both of Germany

[73] Assignee: Hofmann Werkstatt-Technik GmbH, Pfungstadt, Germany

[21] Appl. No.: 923,672

[22] Filed: Sep. 4, 1997

[30] Foreign Application Priority Data

Sep. 6, 1996 [DE] Germany .................. 196 36 268.7

[51] Int. Cl.[6] ........................... G01M 1/22; G01M 1/32
[52] U.S. Cl. ......................... 73/462; 318/558; 318/270
[58] Field of Search .................. 73/460, 462, 475, 73/487; 318/268, 269, 270, 272, 558

[56] References Cited

U.S. PATENT DOCUMENTS

| | | |
|---|---|---|
| 4,046,017 | 9/1977 | Hill . |
| 4,419,894 | 12/1983 | Matsumoto . |
| 5,172,596 | 12/1992 | Rothamel et al. . |
| 5,209,116 | 5/1993 | Okumura . |
| 5,587,528 | 12/1996 | Rothamel et al. . |

*Primary Examiner*—Bentsu Ro
*Attorney, Agent, or Firm*—Pillsbury Madison & Sutro

[57] ABSTRACT

In a method of rotating a rotary member on a balancing machine into balancing positions in first and second balancing planes, after the unbalance measuring run the rotary member is braked and thus rotated into the balancing position in the first balancing plane, with the braking deceleration being measured. The rotary member is then accelerated to a rotary speed of at most 80 rpm for rotation into the balancing position in the second balancing plane. The rotary member is then braked so that the braking travel resulting from the measured deceleration corresponds to the differential angle still remaining as far as the balancing position in the second balancing plane.

16 Claims, 5 Drawing Sheets

METHOD OF ROTATING A ROTARY MEMBER IN A BALANCING MACHINE INTO BALANCING POSITIONS IN FIRST AND SECOND BALANCING PLANES

FIELD OF THE INVENTION

The invention concerns a method of rotating a rotary member rotatably mounted in a balancing machine drivably by a drive means into balancing positions in first and second balancing planes, for dynamic unbalance mass compensation to balance the rotary member.

BACKGROUND OF THE INVENTION

In a typical form of balancing machine for balancing a rotary member such as a motor vehicle wheel, the rotary member is mounted on a main shaft of the balancing machine, which is driven in rotation by a drive means such as an electric motor. Unbalance of the rotary member is ascertained in the course of an unbalance measuring run, during which the main shaft with rotary member clamped thereon is driven in rotation by the motor.

When the main shaft is stopped however, the main shaft or the rotary member to be balanced, which is carried thereon, is generally not disposed in the appropriate position, namely the balancing position, in which unbalance of the rotary member can be compensated, for example by fitting a balancing wheel to the rotary member. When balancing for example a motor vehicle wheel it is desirable for the wheel which is clamped on the main shaft of the balancing machine to be moved into such a position, referred to as the balancing angular position, that the position on the motor vehicle wheel to which a suitable balancing weight is to be fitted is disposed perpendicularly above the main shaft, that is to say in the 12 o'clock position. That position can be referred to as the easy balancing position as it is so disposed that the balancing machine operator has ready access to the point on the vehicle wheel, at which the balancing weight is to be fitted. When balancing the rotary member therefore it is necessary for the rotary member to be rotated from the position in which it stopped after the unbalance measuring run, into the rotary angular stoppage position which is desired for the balancing operation and which thus corresponds to the balancing position. In practice that is done by hand. Furthermore, when dynamic balancing is to be effected on the rotary member, which involves effecting balancing at balancing positions in first and second balancing planes on the rotary member, for example by fitting balancing weights at the appropriate locations in the respective balancing planes, when changing over from the balancing angular position in which a balancing operation was effected on the rotary member in the first balancing plane, the rotor has to be moved from the first balancing position into a second balancing position to provide for balancing in the second balancing plane. In this case also in a practical context the rotary member is frequently rotated into the second balancing angular position by hand. In that situation the operator has to observe a display which shows that the main shaft and the rotary member carried thereon are in the appropriate balancing position.

In one form of a procedure for balancing a rotary member, as is to be found in U.S. Pat. No. 5,209,116, a rotary member which is rotatably mounted in a balancing machine is accelerated from the stopped condition to a specific rotary speed which in that case is more particularly 1500 rpm and which represents the measuring speed, with an unbalance measurement procedure then being conducted to determine the need for mass compensation on the rotary member to provide for balancing thereof. In order to rotate the rotary member into the required balancing position, the rotary member is braked or retarded, with the deceleration of the rotary member in the course of the retardation process being monitored and the retardation operation being controlled in dependence thereon in such a way that the rotary member is finally stopped in the required balancing position to effect mass compensation in respect of the unbalance of the rotary member.

DE 35 41 459 discloses a procedure which involves effecting balancing of a rotary member in a first balancing plane and then rotating the rotary member into a second balancing position for balancing thereof in a second balancing plane. EP 0 383 038 A2 also discloses a procedure which comprises counting pulses representing angle increments in order to monitor the speed of rotation of a rotary member when it is being rotated into the appropriate balancing position, with the procedure involved in retarding the rotary member being controlled also in dependence on the monitored deceleration of the rotary member, by virtue of evaluation of the pulses produced by the pulse generator or incremental counter, until the rotary member is in a stopped condition. U.S. Pat. No. 4,419,894 also discloses monitoring and controlling acceleration of a rotary member and retardation thereof when rotating the rotary member into a balancing position, by evaluating pulses representing angle increments. EP 0 168 514 A1 discloses a procedure for stopping a rotary member which requires balancing, by using clock pulses of an incremental generator for stopping the rotor in the balancing position and evaluating the acceleration profile of a part of the run-up or acceleration phase, for the start of the retardation phase. EP 0 550 816 A2 discloses a positioning brake as a device for turning the rotary member into the appropriate position and which also serves as a holding brake for holding the rotary member when it has been turned into the correct balancing position. EP 0 524 465 discloses a single-phase or capacitor-type motor which is used for driving a rotary member and for decelerating same, in a balancing machine. In that arrangement a phase shift in respect of the ac voltages applied to the electric motor is produced to provide for retardation of the rotating rotary member.

SUMMARY OF THE INVENTION

An object of the present invention is to provide a method of rotating a rotary member such as a motor vehicle wheel into balancing positions in first and second balancing planes in a balancing machine, which provides for simplification of rotation of the rotary member from a first balancing position into a second balancing position.

Another object of the present invention is to provide a method of rotating a rotary member rotatably mounted in a balancing machine sequentially into first and second balancing positions in first and second balancing planes for dynamic balancing, which affords an automatically performable procedure combined with accurate control in terms of stopping the rotary member in the respective positions.

In accordance with the principles of the present invention the foregoing and other objects are attained by a method of rotating a rotary member such as a motor vehicle wheel which is rotatably mounted in a balancing machine drivably by a drive, into balancing positions in first and second balancing planes for dynamic balancing thereof, wherein after an unbalance measuring run in which the balancing positions and the balancing masses in the first and second balancing planes are determined, the rotary member is braked or decelerated for rotation into the balancing position in the first balancing plane, with the deceleration of the rotary member which occurs in that situation being measured. The rotary member is then accelerated by the drive means to a given rotary speed which is at most 80 rpm, for rotating the rotary member into the balancing position in the second balancing plane. The drive to the rotary member is then terminated and the rotary member is thereafter retarded in such a way that the braking travel resulting from the measured deceleration of the rotary member corresponds to the difference angle that still remains, as far as the balancing position in the second balancing plane.

As will be seen from an embodiment of the method according to the invention which is described in greater detail hereinafter, the method of the invention provides that, after the input of a start command signal, for example by pressing a button, the main shaft with the rotary member such as a motor vehicle wheel disposed thereon is automatically rotated from a stopped condition in the first balancing position into the second balancing position, without the machine operator having to observe a position display which changes with the rotary angular position of the rotary member, for example on a monitor on the balancing machine, to watch for the rotary member being rotated into the appropriate balancing position. The main shaft with the rotary member carried thereon is automatically stopped in the second balancing position and can be fixed in position for example by a brake which was also used for retardation of the main shaft after the unbalance measuring run, more particularly an electromagnetic brake unit as is to be found for example in EP 0 550 816 A1.

Preferably however the braking operation is effected without an additional brake unit by means of the electric motor which furnishes the drive for the main shaft in the unbalance measuring procedure. The motor used in that case is preferably a single-phase ac motor, as is to be found for example in EP 0 524 465 B1 to which reference is therefore made, or a three-phase motor. In that case the braking action is produced solely by the torque in the drive motor being reversed, which can be referred to as counter-current braking. That can be effected by the phase sequence of the ac voltages applied to the electric motor, whether a single-phase ac motor or a three-phase motor, involving a phase displacement of 90° in the former case and a phase displacement of 120° in the latter case, as shown for example by the operating condition illustrated in FIG. 4 of EP 0 524 465 B1. As soon as the main shaft and the rotary member carried thereon have reached the desired balancing position, the motor current is switched off precisely at that balancing position and thus further rotation of the main shaft and the rotary member carried thereon in the opposite direction is prevented. The measured level of deceleration of the main shaft in the retardation procedure, based on the given rotary speed of the main shaft, affords a given braking travel corresponding to a given rotary angle. After the drive for the main shaft is switched off, the retardation procedure of the present invention is controlled in such a way that the end of that braking travel coincides with the differential angle which still has to be covered by the main shaft and the rotary member, until reaching the balancing position. That can be effected by the braking operation commencing at a given time so that the braking operation is terminated after the expiry of a given period of time corresponding to the differential angle that still remains to be covered before the main shaft reaches the balancing position, namely the braking travel. In this respect the given differential angle may be for example 30°, before the balancing position is attained.

For that purpose the balancing travel may also be effected in first and second stages or phases, with an interruption in the braking operation between the two braking stages or phases, in order to achieve identity between the end of the braking travel and the differential angle of travel into the balancing position. The end of the interruption in the braking operation may then occur at a given differential angle, for example at 30°.

If in the course of the braking operation, for example in the second braking phase as described above, there is identity in terms of the remaining braking travel and the differential angle position of the main shaft, a timer can preferably be switched on at a short angular spacing of for example 3° before the main shaft reaches the desired balancing position. From the rotary speed and the rotary angle position of the main shaft occurring at the time of the timer being switched on, the timer, with the measured braking deceleration, determines a time interval, on a time basis which is independent of the rotary movement of the main shaft; at the end of that time interval the motor current or counter-current for the retardation procedure is switched off, with the main shaft stopped. An incremental generator which is coupled to the rotary movement of the main shaft or rotary member in the manner disclosed for example in DE 31 24 248 A1 or EP 0 074 416 A1 cannot enable the motor which acts as the counter-current brake to be switched off, thereby to terminate the counter-current braking action, precisely when the main shaft and the rotary member have reached the reference or target balancing position, when the system is operating at the low rotary speed which obtains shortly before the main shaft and the rotary member reach the reference or target angular position constituting the required balancing position. Switching off the motor in good time prevents the assembly from rotating in the opposite direction.

As indicated above, acceleration of the main shaft from the stopped condition or the first balancing position in a first balancing plane is effected in such a way that a maximum rotary speed of 80 rpm is not exceeded. That ensures that, with the wheel guard of the balancing machine in the open condition, the rotary speed remains so low that the machine operator is not put at risk due to pieces of dirt which may fly off the wheel which is being rotated in the balancing machine. The limitation in terms of rotary speed can be determined from measurement of the level of acceleration $a_1$ in the run-up or acceleration phase, the level of deceleration $a_2$ in the braking or retardation phase, and the difference $\phi_g$ between the actual rotary angle and the reference rotary angle constituting the balancing position, in particular in the second balancing plane, in accordance with the following relationship:

$$n_{max} = \frac{60}{2 \cdot \pi} \sqrt{2 \cdot \phi_g \frac{a_1 \cdot a_2}{a_2 - a_1}}$$

The rotary speed of the main shaft is monitored in the run-up or acceleration phase. Shortly before the main shaft reaches the calculated maximum rotary speed $n_{max}$ the torque of the motor is switched off and retardation of the main shaft with the rotary member carried thereon is implemented in accordance with the method of the invention. In that situation torque reversal may occur in the motor, to provide a counter-current braking action, or an electromagnetic brake unit as is to be found for example in EP 0 550 816 A1 can be switched on.

Further objects, features and advantages of the invention will be apparent from the following description of a preferred embodiment of the method of the invention.

DESCRIPTION OF THE PREFERRED EMBODIMENT

Figure 5:
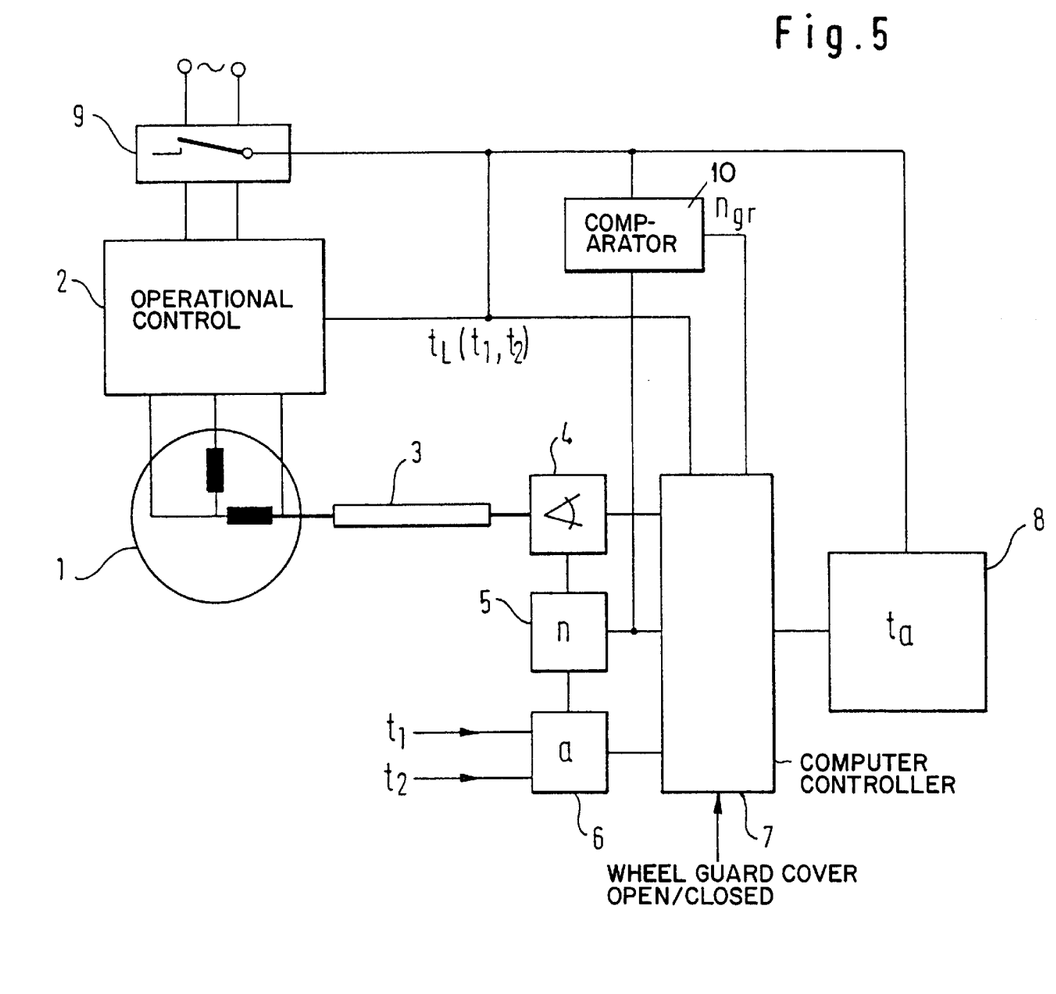
FIG. 5 shows a block circuit diagram containing the essential components for carrying the method according to the invention into effect.

Reference will first be briefly made to FIG. 5 in which reference numeral 1 denotes an electric drive motor such as a single-phase ac motor or a three-phase motor, reference numeral 2 denotes an operational control arrangement and reference numeral 3 diagrammatically indicates a main shaft of a balancing machine on which a rotary member such as more particularly a motor vehicle wheel can be mounted for balancing thereof at first and second positions in first and second balancing planes, to provide a dynamic balancing result.

Figure 1:
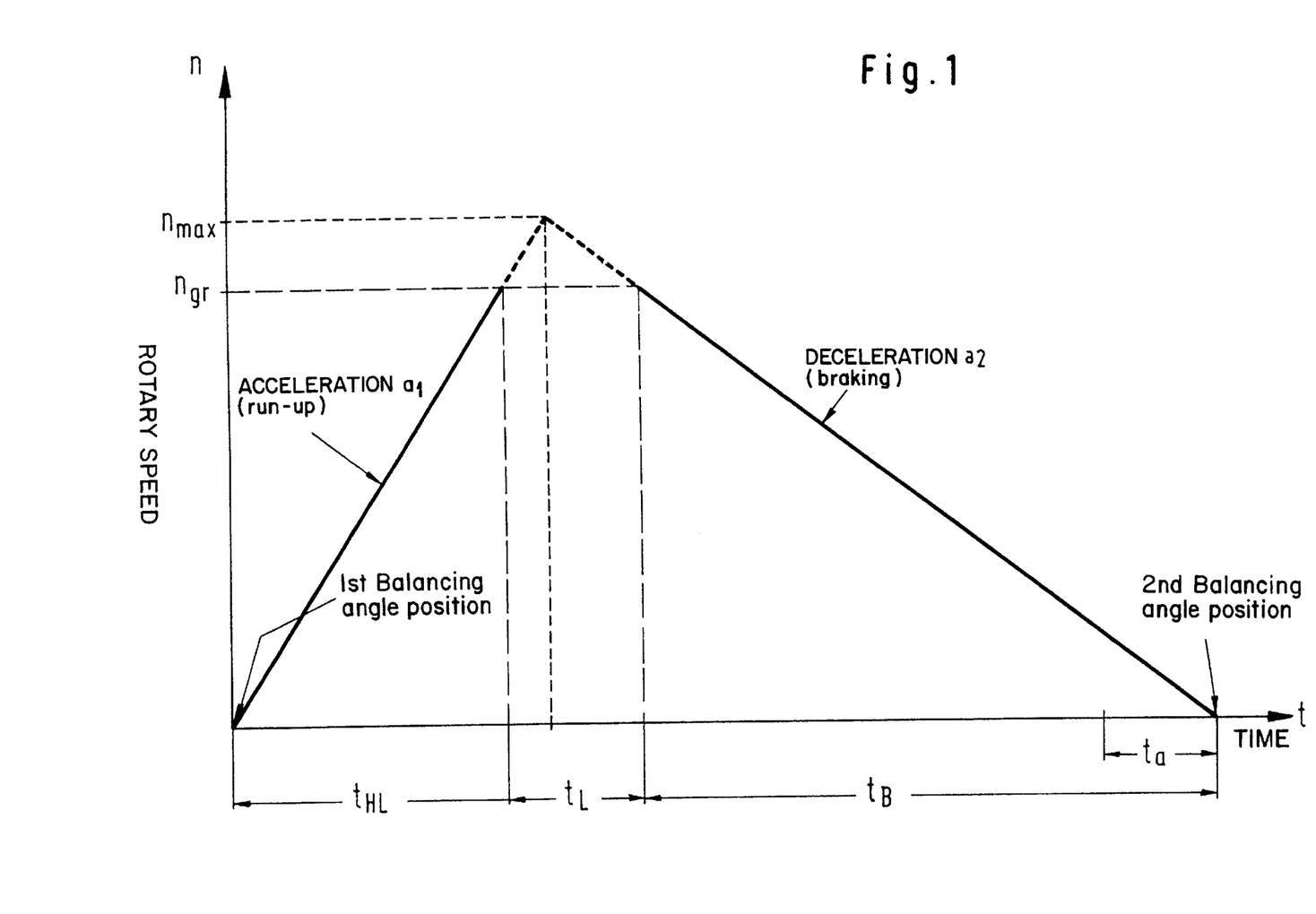
FIG. 1 is a graph showing the variation in the rotary speed of the main shaft of a balancing machine in an embodiment of the invention, with the rotary speed n of the main shaft being shown on the ordinate and time t being shown on the abscissa.

Looking at FIG. 1, shown therein by way of example is one configuration of a variation in rotary speed with which a motor vehicle wheel clamped on the main shaft of the balancing machine is rotated from a first angular balancing position in a first balancing plane into a second angular balancing position in a second balancing plane. As will be described in greater detail hereinafter with reference to FIGS. 3 and 4, the main shaft of the balancing machine has been brought to a stop in a first balancing position. After a suitable balancing weight has been fixed to the motor vehicle wheel at the appropriate balancing position in the first balancing plane, the motor vehicle wheel is rotated into the second balancing position for unbalance compensation in a second balancing plane, thereby to provide for dynamic balancing of the wheel. So that this procedure can be carried out in a semi-automatic fashion, a start command can be produced for accelerating the main shaft with the motor vehicle wheel clamped thereon, for example by pressing a button. From the stopped condition the motor vehicle wheel is started rotating in a run-up or acceleration phase at the level of acceleration indicated at $a_1$ in FIG. 1. On the basis of that acceleration $a_1$ which can be ascertained during the run-up or acceleration phase in the unbalance measuring procedure or during the run-up or acceleration phase in the procedure for rotating the motor vehicle wheel from the first balancing position in a first balancing plane into a second balancing position in a second balancing plane, together with the level of braking deceleration indicated at $a_2$ which was ascertained in the retardation phase after the measuring run, as will be described hereinafter, and the difference $\phi_g$ between the actual rotary angular position constituting the first balancing position and the reference or target rotary angle position constituting the second balancing position, it is possible to calculate a maximum rotary speed $n_{max}$, as has already been discussed above. In the run-up or acceleration phase the main shaft with rotary member thereon is accelerated to just before that maximum rotary speed and the drive is switched off at a lower rotary speed indicated at $n_{gr}$ in FIG. 1. In the embodiment illustrated in FIG. 1, the acceleration phase took place in the period identified as $t_{HL}$ up to the rotary speed $n_{gr}$. Because the machine is switched off to ensure that the rotary speed remains below a maximum speed of for example 80 rpm, the machine operator is not endangered by for example pieces of dirt which may fly off the rotating wheel, when the wheel guard is open.

Figure 3:
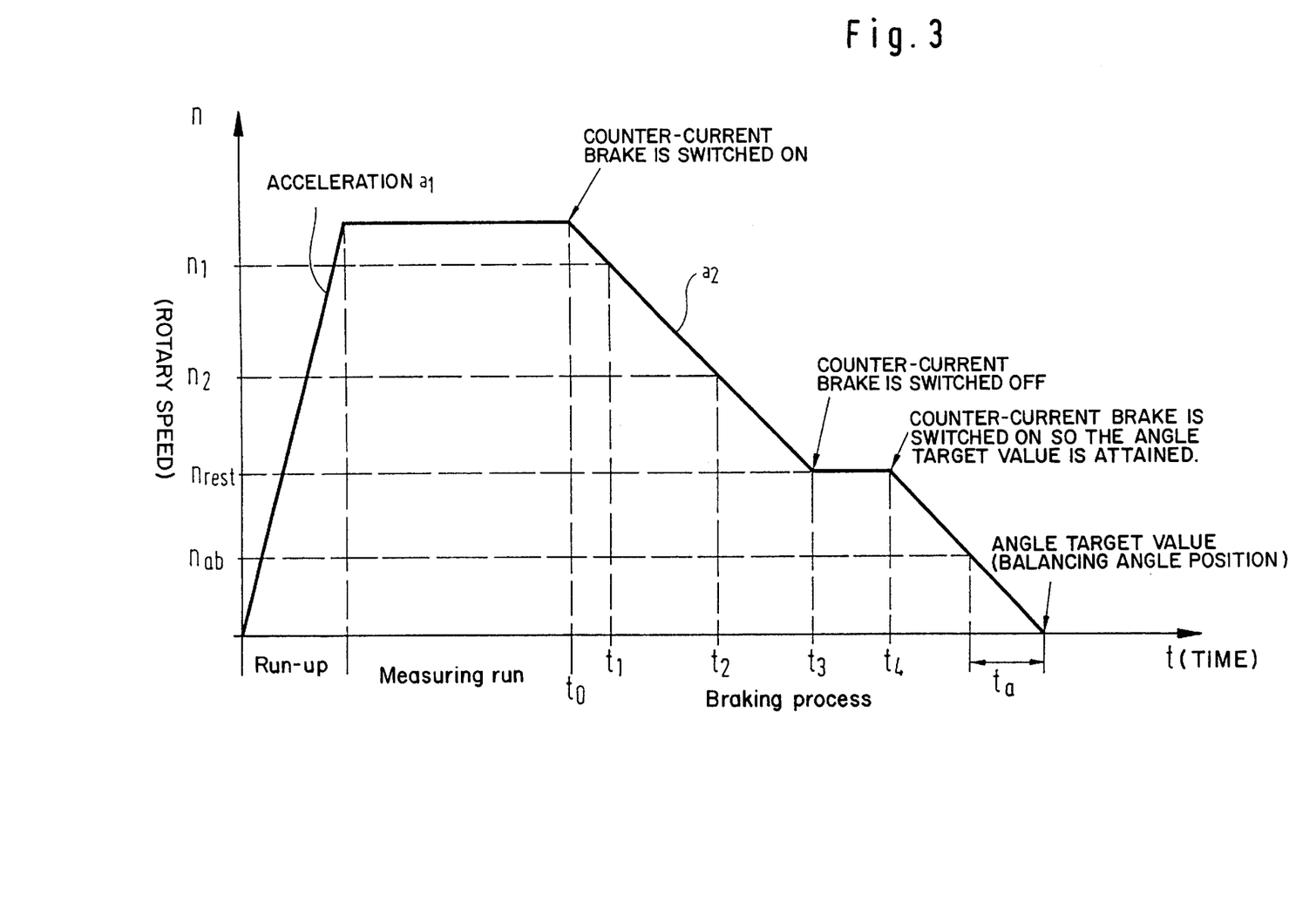
FIG. 3 shows a further graph showing the variation in the rotary speed of the balancing machine main shaft, in which the rotary member is brought to a stop after execution of the unbalance measuring run in a given rotary angle position and more particularly a balancing position.
Figure 4:
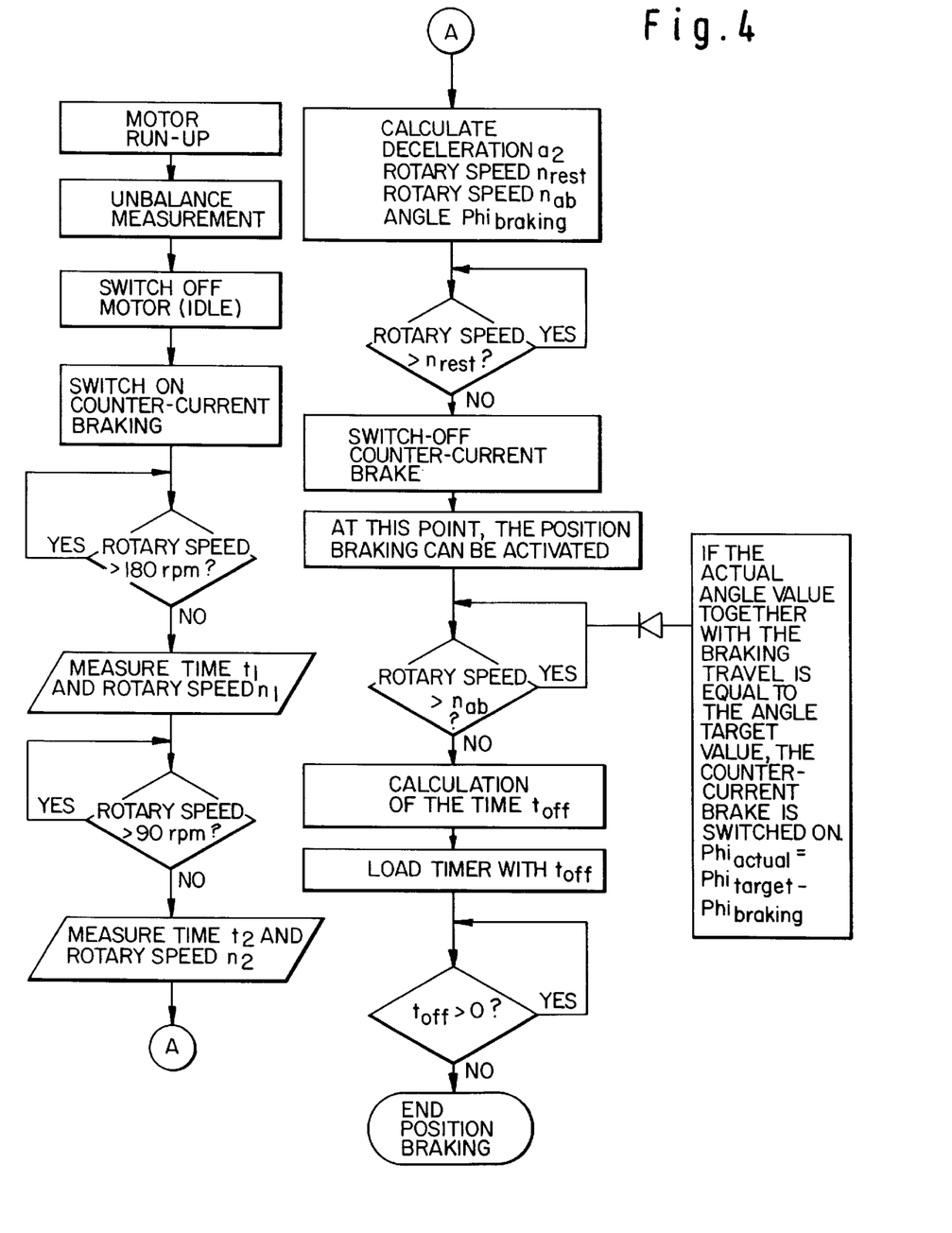
FIG. 4 shows a flow chart in respect of the performance configuration shown in FIG. 3.

As the deceleration $a_2$ of the main shaft in the retardation or braking procedure which was preferably measured after the unbalance measuring run as will be described hereinafter with reference to FIGS. 3 and 4 is known, after the main shaft drive is switched off or switched over to an idle condition, as can be seen in particular from FIG. 1, it is possible to establish the moment in time after expiry of the time interval $t_L$, from which the main shaft is braked or retarded, so as to provide a braking travel, at the end of which the main shaft with the rotary member carried thereon is in the second balancing position. During the time $t_B$ the main shaft is subjected to a braking effect, as shown in FIG. 1. That braking effect may also take place in first and second stages or phases, as occurred in the braking or retardation procedure after the measuring run. This braking operation will be described in greater detail hereinafter with reference to FIGS. 3 and 4.

Figure 2:
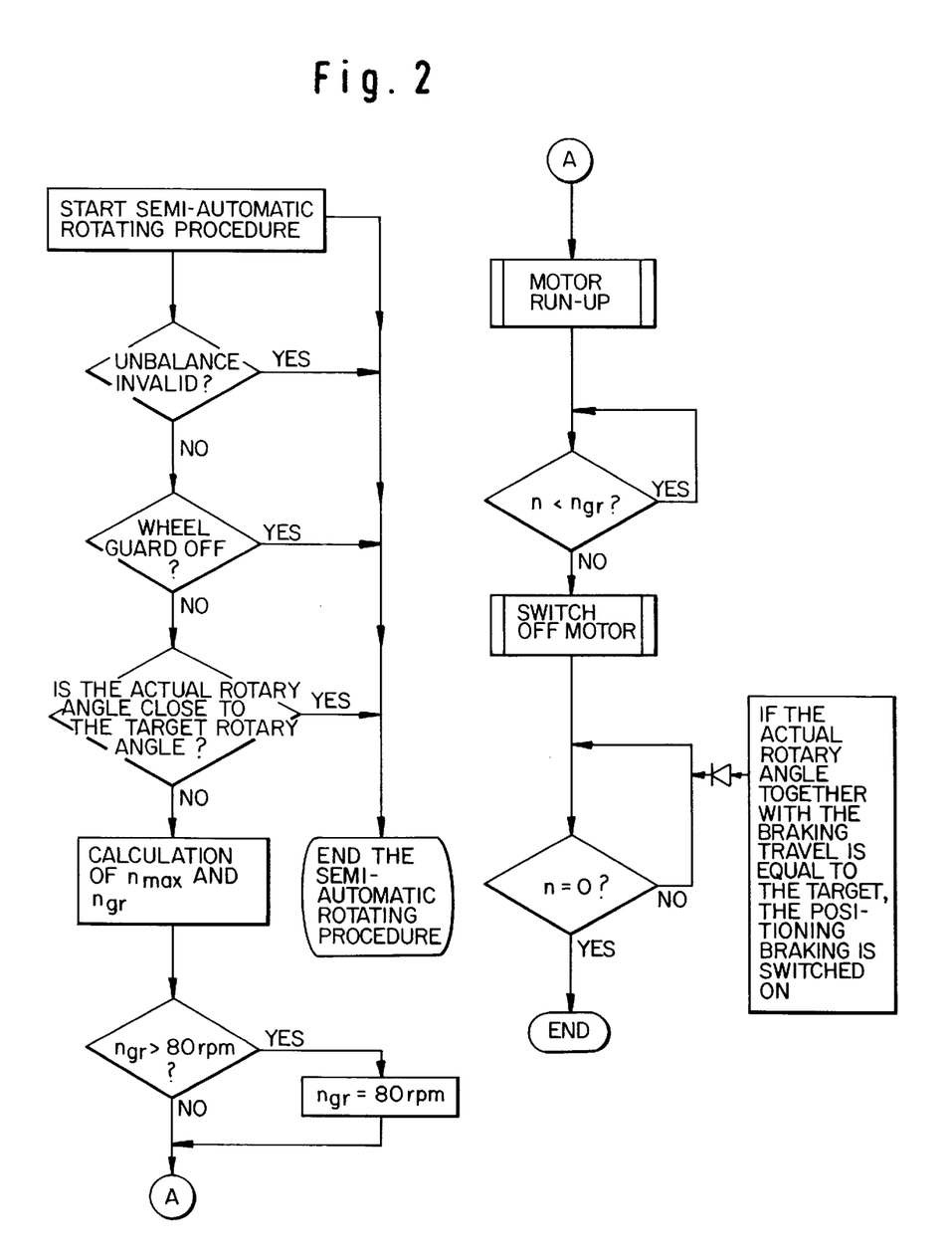
FIG. 2 is a flow chart for implementing the method of the invention in the procedure for rotating the main shaft into the required balancing position.

This semi-automatic procedure for rotating the main shaft with the rotary member carried thereon into the appropriate position for balancing thereof is also illustrated in the flow chart of FIG. 2.

The operation of braking or retarding the main shaft can be implemented in any suitable manner, for example by means of an electromagnetic brake unit as is shown in EP 0 550 816 A1 to which reference may therefore be made. In the course of the braking operation, at a given moment in time or at a given angular position, more particularly just before the balancing position is reached, for example at about 5° to 15° before the balancing position, the difference between the actual rotary speed obtaining at that time and a reference or target rotary speed which is calculated on the basis of the measured braking deceleration at that time is ascertained and the braking moment of the electromagnetic brake unit is set in dependence on the ascertained difference, in order to adapt the remaining braking travel to the residual rotary angle, as far as the actual balancing position.

Preferably however the braking operation is effected solely by the torque of the drive motor being reversed, to afford a counter-current braking action. The drive motor, as indicated above, may be a single-phase ac motor or a three-phase motor. Preferably, a braking action of that kind is also employed when first stopping the main shaft in the first balancing position. That procedure will be described hereinafter with reference to FIGS. 3 and 4.

Looking therefore now at FIGS. 3 and 4, the rotary member such as the motor vehicle wheel which is carried on the balancing machine main shaft is brought up to the measuring rotary speed in a run-up or acceleration phase at the acceleration $a_1$. At the measuring rotary speed the unbalance measuring procedure can then be performed to ascertain unbalance of the rotary member. The motor is then switched over to idle and the counter-current braking effect is switched on at time $t_0$ in FIG. 3 so that retardation of the main shaft 3 then begins. During the braking procedure, in the illustrated embodiment, the respective rotary speeds indicated at $n_1$ and $n_2$ of the main shaft are measured at two measurement points indicated by times $t_1$ and $t_2$ in FIG. 3. It is also possible to measure the times (time $t_1$ and time $t_2$) at two predetermined rotary speeds $n_1$ and $n_2$. The braking deceleration $a_2$ is calculated therefrom in accordance with the following equation:

$$a_2 = \frac{2 \cdot \pi}{60} \cdot \frac{n_2 - n_1}{t_2 - t_1}$$

In the course of the braking procedure, the method involves now selecting a residual rotary speed $n_r$ at which the main shaft with the rotary member or wheel clamped thereon can be brought to a stop, with the ascertained level of deceleration $d_2$, within a given angular difference $\phi_r$, which is preferably 30°. The braking procedure which is afforded by the torque reversal effect or the counter-current braking action is possibly terminated to adjust the rotary angle difference (residual rotary angle $\phi_r$=30°) so that the deceleration $a_2$, the residual rotary angle $\phi_r$ and the residual rotary speed $n_r$ occur in precisely mutually matching relationship. The residual rotary speed $n_r$ ensues in accordance with the following formula:

$$n_r = \frac{60}{2 \cdot \pi} \cdot \sqrt{-2 \cdot \phi_r}$$

During the renewed braking operation, with the counter-current braking effect by virtue of torque reversal being brought into operation again, that is to say during the second braking phase, the rotary speed drops to $n_{ab}$. That rotary speed is preferably reached shortly before the reference or target rotary angle which corresponds to the balancing position. The corresponding rotary angle position $\phi_{ab}$ can be for example 3° before the reference or target rotary angle constituting the balancing position ($\phi_{ab}$=3°). When that rotary speed is reached a timer is loaded. The timer provides a time interval indicated at $t_a$ in FIG. 1, at the end of which the main shaft and the rotary member carried thereon comes to a stop. The timer provides that, at that moment in time, the counter-current braking action produced by the electric drive motor in its reversed-torque mode is switched off. The time interval $t_a$ which corresponds at the rotary speed $n_{ab}$ to the residual angle $\phi_{ab}$ which is for example 3°, ensues in accordance with the following formula:

$$t_a = \frac{2 \cdot \pi}{60} \cdot \frac{n_{ab}}{a_2}$$

The rotary speed $n_{ab}$ contained in that formula, (for example $\phi_{ab}$=3°), before the reference angular value is reached, is given by the following formula:

$$n_{ab} = \frac{60}{2 \cdot \pi} \cdot \sqrt{-2 \cdot \phi_{ab}}$$

It is necessary for attainment of the reference or target angular position which constitutes the first balancing position of the main shaft and the rotary member or vehicle wheel clamped thereon to be detected immediately. At that moment in time the supply of current to the electric drive motor, which provides the counter-current braking effect, is switched off. The current supply is switched off in dependence on time. An incremental generator which is coupled to the rotary movement of the main shaft or the rotary member in the manner disclosed in DE 31 24 248 A1 or EP 0 074 416 A1 cannot enable the motor to be switched off, thereby to terminate the counter-current braking action, precisely when the main shaft and the rotary member have reached the reference or target angular position constituting the required balancing position, having regard to the low rotary speed shortly before the stopped condition is attained. It will be appreciated therefore that the rotary member to be balanced can be brought into the desired stopped position, that is to say the required balancing position, by virtue of timed control of the variation in the rotary speed of the rotary member.

The braking procedure in the operation of rotating the rotary member into the appropriate position, as described above with reference to FIGS. 1 and 2, can also be implemented by means of the electric motor in the form of a single-phase ac motor or a three-phase motor. In that case also the timer is switched on with the loaded time $t_a$, in particular shortly before the main shaft reaches the stopped condition constituting the balancing position, in order to switch the motor off in good time in order to prevent it from rotating in the reverse direction. The operation for rotating the rotary member on the main shaft into the required balancing position can however also be performed in the manner as already described above with reference to FIG. 3, that is to say, the time interval $t_L$ during which the drive and the brake for the idle movement of the main shaft are switched off can occur between two portions of the braking operation from the time indicated at $t_3$ in FIG. 3 to the time indicated at $t_4$ in FIG. 3. In addition, preferably just before the main shaft with the rotary member thereon reaches the second balancing position, the timer which comes into operation in the retardation phase after the measuring run can be loaded and can provide for stopping the main shaft by switching off the electric motor drive at the moment in time at which the main shaft reaches the second balancing position.

Reference will now be made to FIG. 5 showing a block circuit diagram of an embodiment of an arrangement with which the above-described method of the invention can be carried into effect.

As already indicated above, reference numeral 1 denotes an electric drive motor which is shown in the form of a single-phase ac motor for driving a main shaft 3, illustrated diagrammatically in FIG. 5, of a balancing machine, on which a rotary member such as more particularly a motor vehicle wheel to be balanced is mounted. Connected to the main shaft 3 is a pulse generator or incremental generator 4 which supplies angle increments. The generator 4 may be for example of any suitable configuration, for example of the configuration shown in DE 31 24 248 A1 to which reference is now directed.

Connected to the generator 4 is a rotary speed sensor 5 which forms a rotary speed-proportional signal from the sequence in respect of time of the angle increments supplied by the generator 4. Connected to the rotary speed sensor 5 is a braking deceleration sensor 6 which, after implementation of an unbalance measuring run, at different times $t_1$ and $t_2$ (FIG. 1), ascertains the rotary speed-proportional signals supplied by the rotary speed sensor 5 and, having regard to the time difference $t_2$–$t_1$, forms a braking deceleration signal that is proportional during the braking procedure.

Control of the various operating conditions of the electric motor 1 is effected by means of an operational control arrangement 2 which has various relays for the forward and reverse running of the motor and for switching a torque capacitor. The operational control arrangement 2 can be of any suitable configuration, as is known from EP 0 524 465

A1, for a single-phase ac motor. The arrangement may include a device for minimising switching sparking or arcing at the motor relays. For that purpose, the assembly may include an amplifier circuit for detecting the relay switching times by program-controlled evaluation of the current configuration in the relay coils upon switching-on and switching-off, an amplifier circuit for converting the mains voltage into a mains-frequency rectangular signal for program-controlled mains-synchronous switching of the relays and a resistor for discharge of the torque capacitor for the single-phase ac motor by way of the rest contact of the relay serving for switching of the capacitor so that its charge condition upon switching-on is known. Little or no switching sparks or arcing is caused by opening of the relay contacts shortly before the zero-passage of the mains voltage.

The signals formed by the generator 4, the rotary speed sensor 5 and the deceleration sensor 6 are evaluated and analyzed in a computer 7 which can be in the form of a microcontroller. From the braking deceleration which is supplied by the deceleration sensor 6, the computer 7 determines the resulting braking travel which the main shaft 3 and the rotary member clamped thereon cover in the braking operation. That braking travel corresponds to a given rotary angle. As the respective rotary angle of the main shaft 3 is ascertained by the generator 4, the computer 7 performs a control action, more especially by suitably altering the rotary speed of the main shaft, such that the end of the ascertained braking travel coincides with the desired stoppage rotary angle position which corresponds therefore to the balancing position in which a balancing operation is to be effected.

In the procedure for rotating the rotary member into the required balancing position, as shown in FIG. 1, in which the main shaft 3 with the rotary member thereon is moved from the stopped position into a balancing position, a start button is actuated, whereby the motor current is switched on for example by closure of the switch indicated at 9 in FIG. 5. Preferably this is the same control button which is actuated to start the unbalance measuring run when the wheel guard hood is closed. In the procedure illustrated in FIG. 1 in which the rotary member is rotated from the first balancing position into a second balancing position, the wheel guard hood is in an open position. A corresponding signal is fed to the computer 7. On the basis of that signal, the acceleration phase is brought to an end at a given rotary speed indicated at $n_{gr}$ in FIG. 1. That rotary speed threshold which can be for example 80 rpm is monitored in a comparator 10. The comparator 10 compares the maximum rotary speed $n_{gr}$ supplied by the computer 7 to the actual value of the rotary speed, which is continuously supplied by the rotary speed sensor 5, and, when the rotary speed $n_{gr}$ is reached, switches off the motor drive, for example by opening the switch 9, or switches the operational control arrangement 2 into an idle mode.

The generator 4 continuously supplies the current actual rotary angle position occupied by the main shaft 3 and the rotary member carried thereon. On the basis of the rotary angle position of the main shaft 3, which prevails when the motor 1 is switched off, and the deceleration $a_2$ of the main shaft 3, which was previously already ascertained during the retardation procedure after the unbalance measuring run, the computer 7 determines the time interval $t_L$ during which the motor 1 remains switched off and the main shaft 3 with rotary member continues to rotate substantially at the rotary speed $n_{gr}$. After expiry of the time interval $t_L$ the motor current is switched on again by closure of the switch 9. The operational control arrangement 2 is set to a braking mode, involving a counter-current braking action by torque reversal. That corresponds to the switching condition shown in FIG. 4 of above-mentioned EP 0 524 465 B1. The braking travel during the retardation time $t_B$, which arises out of the deceleration $a_2$, corresponds to the rotary angle that the main shaft 3 covers until it reaches the required balancing position. A timer 8 which is loaded with the above-defined time interval $t_a$ is switched on at a rotary angle position just before the balancing position is reached, for example 3° before that position. That time interval $t_a$ is determined from the measured deceleration $a_2$, and the rotary angle position and speed of rotation of the main shaft 3 at the time at which the timer 8 is switched on. After expiry of the time interval $t_a$ the motor current is switched off for example by the switch 9 being opened at the time at which the main shaft 3 stops, that is to say at the end of the braking travel, so that rotation of the main shaft in the opposite direction is prevented.

In the case of the embodiment illustrated in FIGS. 1 and 2 adaptation of the braking travel to the rotary angle which is to be covered by the main shaft until it moves into the balancing position is effected by virtue of the fact that the switch-on time for the braking operation is such, by virtue of the time interval $t_L$ being of a suitable length, that there is identity between the braking travel and the rotary angle involved. It is however also possible for the braking operation to be implemented in two phases, as occurred when retarding the main shaft 3 and the rotary member carried thereon after the unbalance measuring run. That braking operation is illustrated in FIGS. 3 and 4. That braking operation is performed in two phases, as follows, by means of the arrangement illustrated in FIG. 5. In the embodiment illustrated in FIG. 3 the braking operation is interrupted during a period of time between the times $t_3$ and $t_4$ (see FIG. 3).

During the retardation of the main shaft 3 and the rotary member carried thereon, after the measuring run, the operational control arrangement is actuated by the computer 7 or another central computing unit (not shown) in such a way that for example the switching condition of the relays and capacitors as shown in FIG. 4 of above-mentioned EP 0 524 465 B1 prevails. That operating condition which represents a first braking phase occurs during a period of time which obtains in FIG. 3 from the switch-on time $t_0$ of the braking operation, when the counter-current braking effect is brought into operation, to the time $t_3$, when the counter-current braking effect is removed. When the counter-current braking effect is switched off during a period of time indicated at $t_3$ to $t_4$, the operating condition illustrated in FIG. 3 of above-mentioned EP 0 524 465 B1, constituting an idle condition, can be set for example in the operational control arrangement 2. During that period the main shaft 3 continues to rotate at an almost constant speed $n_r$ for a short period from the time $t_3$ to the time $t_4$. That interruption in the braking procedure provides that the actual braking travel is so set that, when the braking procedure is resumed at time $t_4$, at the end of the second braking phase the main shaft 3 and the rotary member carried thereon have reached the reference angle position corresponding to the required balancing position.

When implementing the braking procedure by means of the electric motor 1 which is also used to drive the main shaft 3, it is necessary for the motor to be switched off when the end of the braking procedure is reached, that is to say when the main shaft 3 is in the stopped condition with the rotary speed thereof being zero, in order to prevent the motor and the main shaft 3 from rotating in the opposite direction. However the motor cannot be switched off with the required degree of accuracy if it is only the angular information afforded by the generator that is evaluated at a low speed of rotary movement in the proximity of the stoppage condition. More specifically, at low rotary speeds, the periods of time between the individual pulses outputted by the generator 4 are so great that the instantaneous rotary speed can only be ascertained with a time delay so that the motor 1 cannot be switched off to prevent further rotary movement thereof in the reverse direction after reaching the stoppage condition, solely on the basis of the information from the incremental generator 4. To overcome that difficulty, connected to the computer 7 is the above-mentioned timer 8 which is loaded with a time, namely the above-defined time interval $t_a$, when a given rotary speed threshold is reached. That rotary speed threshold occurs at the above-defined rotary speed $n_{ab}$ and can occur for example when there is still a residual angle $\phi_{ab}$ of for example 3°, before the balancing position is reached. As indicated above, the time interval $t_a$ is determined from the rotary speed $n_{ab}$ obtaining when the timer 8 is switched on, the residual angle $\phi_{ab}$, the braking deceleration a and, if a switching delay $t_{RV}$ for the relay or relays which are to be switched in the operational control arrangement is to be taken into account, that switching delay, as already explained above. After expiry of the time interval $t_a$ the timer 8 causes opening of the switch 9 so that the supply of current to the motor 1 is interrupted. This may be for example a mains switch with which the drive motor is appropriately connected to the supply mains. This switching-off operation coincides with the attainment of the required balancing position, thus ensuring that the main shaft 3 stops at that required rotary angle position. The timer 8 can be switched on at any moment in time within the second braking phase, as from the time $t_4$. Within that braking phase which is the second braking phase in the illustrated embodiment, it is guaranteed that the end of the remaining braking travel coincides with the desired rotary angle stoppage position or balancing position of the main shaft and the rotary member carried thereon.

It will be seen from the foregoing description of a preferred embodiment of the invention that the invention provides a method of rotating an electric motor-driven balancing machine main shaft into a plurality of balancing positions by means of a simple substantially automated procedure, involving components which can be readily incorporated in the balancing machine structure.

It will be appreciated that the above-described method according to the invention has been set forth solely by way of example of the principles of the invention and that various modifications and alterations may be made therein without thereby departing from the spirit and scope of the invention.

What is claimed is:

1. A method of rotating a rotary member rotatably mounted in a balancing machine and drivable by a drive means, into balancing positions in first and second balancing planes for dynamic balancing of the rotary member
   wherein after an unbalance measuring run in which the balancing positions and balancing masses in the balancing planes are determined, the rotary member is retarded to be rotated into the balancing position in the first balancing plane and the rotary member deceleration which occurs in that operation is measured,
   wherein the rotary member is accelerated by the drive means to a given rotary speed which is at most 80 rpm for the rotary member to be rotated into the balancing position in the second balancing plane, and
   wherein after termination of the drive the rotary member is retarded in such a way that the braking travel resulting from the measured deceleration of the rotary member corresponds to the differential angle that still remains as far as the balancing position in the second balancing plane.

2. A method as set forth in claim 1
   wherein the acceleration of the rotary member in the acceleration phase to the measurement speed of rotation in the unbalance measurement run is measured, and
   wherein the maximum rotary speed when the rotary member is rotated into the balancing position in the second balancing plane is determined by the equation $$n_{max} = \frac{60}{2 \cdot \pi} \sqrt{2 \cdot \phi_g \frac{a_1 \cdot a_2}{a_2 - a_1}}$$

in which $n_{max}$ denotes said maximum rotary speed,
   $a_1$ denotes the acceleration in the acceleration phase,
   $a_2$ denotes the deceleration when retarding the rotary member, and
   $\phi_g$ denotes the difference between the actual rotary angle position and the reference angle position of the rotary member.

3. A method as set forth in claim 1
   wherein the acceleration of the rotary member in the acceleration phase when rotating the rotary member into the balancing position of the second balancing plane is measured, and
   wherein the maximum rotary speed when the rotary member is rotated into the balancing position in the second balancing plane is determined by the equation $$n_{max} = \frac{60}{2 \cdot \pi} \sqrt{2 \cdot \phi_g \frac{a_1 \cdot a_2}{a_2 - a_1}}$$

in which $n_{max}$ denotes said maximum rotary speed,
   $a_1$ denotes the acceleration in the acceleration phase,
   $a_2$ denotes the deceleration when retarding the rotary member, and
   $\phi_g$ denotes the difference between the actual rotary angle position and the reference angle position of the rotary member.

4. A method as set forth in claim 3
   wherein in the course of retardation of the rotary member at a given time before the balancing position is reached the difference of the actual rotary speed at that time and a reference rotary speed calculated on the basis of the measured deceleration at that time is ascertained and the braking moment applied to the rotary member is adjuated to adapt the remaining braking travel to the residual rotary angle as far as the balancing position in dependence on the ascertained difference.

5. A method as set forth in claim 1
   wherein the rotary member is braked by an electromagnetic braking means.

6. A method as set forth in claim 5
   wherein in the course of retardation of the rotary member at a given time before the balancing position is reached the difference of the actual rotary speed at that time and a reference rotary speed calculated on the basis of the measured deceleration at that time is ascertained and the braking moment of the electromagnetic braking means is adjusted to adapt the remaining braking travel to the residual rotary angle as far as the balancing position in dependence on the ascertained difference.

7. A method as set forth in claim 1 wherein the rotary member is driven by an electric motor and is braked by reversal of the torque of the electric motor.

8. A method as set forth in claim 7 wherein the motor is a single-phase ac motor.

9. A method as set forth in claim 7 wherein the motor is a three-phase motor.

10. A method as set forth in claim 7 wherein a timer is switched on in the course of retardation of the rotary member with the measured deceleration before the respective balancing position is reached, which timer predetermines a time interval from the rotary angle position of the rotary member and the rotary speed at the time of the timer being switched on, at the end of which time interval the motor current is switched off on a time basis which is independent of the rotation of the rotary member upon stoppage thereof.

11. A method as set forth in claim 10 wherein during retardation of the rotary member the deceleration of the rotary member is ascertained and the timer is switched on at a rotary speed which is decelerated to a given value.

12. A method as set forth in claim 10 wherein prior to the timer being switched on retardation of the rotary member is interrupted until at the measured level of deceleration the balancing position is searched by the rotary member within a given rotary angle range which is greater than the rotary angle which is to be covered by the rotary member to the stoppage condition when the timer is switched on.

13. A method as set forth in claim 10 wherein the timer is switched on shortly before the stoppage condition of the rotary member is reached.

14. A method as set forth in claim 13 wherein the timer is switched on about 3° before the stoppage condition of the rotary member is reached.

15. A method as set forth in claim 1 wherein after the unbalance measuring run the rotary member is stopped in the balancing position of the first balancing plane by ascertaining from the measured deceleration a resulting braking travel which corresponds to a given rotary angle and retardation of the rotary member is so controlled that the end of the ascertained braking travel coincides with the balancing position in the first balancing plane.

16. A method as set forth in claim 1 wherein the unbalance measuring run is started by actuation of a switch with a safety wheel guard of the balancing machine closed, and wherein the procedure for rotating the rotary member from the stoppage condition into the balancing position in the second balancing plane with the wheel guard of the machine open and thus with a limitation on the speed of rotation of the rotary member is started by actuating said switch with which the unbalance measuring run is started.

* * * * *